Oct. 12, 1948.     A. M. CANDY     2,451,152
STUD WELDING GUN
Filed Oct. 4, 1945
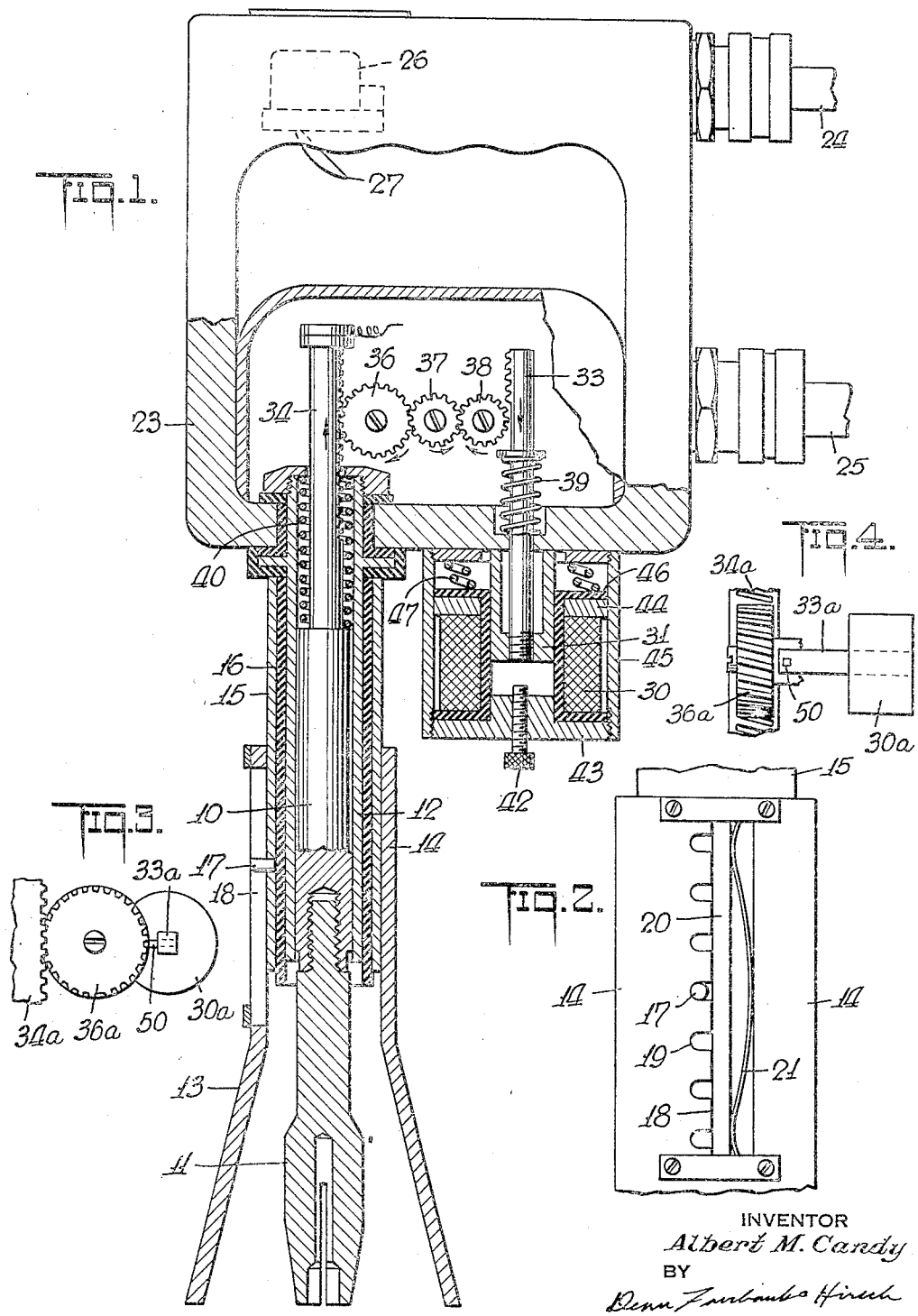
INVENTOR
*Albert M. Candy*
BY
ATTORNEYS Patented Oct. 12, 1948

2,451,152

UNITED STATES PATENT OFFICE 2,451,152

STUD WELDING GUN

Albert M. Candy, La Grange, Ill., assignor, by mesne assignments, to National Cylinder Gas Company, Chicago, Ill., a corporation of Delaware Application October 4, 1945, Serial No. 620,295

7 Claims. (Cl. 219—4)

This invention relates to apparatus for welding the end of a stud or other element to a steel plate or other structure, and of that type in which an arc is formed between the stud and the plate for a sufficient length of time to partially melt the end of the stud and form a pool of metal on the plate, and after which time the stud is forced into the pool and the electric circuit is broken. Apparatus of this type is commonly referred to as a stud welding gun.

In apparatus of this type the stud is usually detachably secured to a plunger and it is common to provide an electromagnet for pulling the plunger and stud away from the plate, and to rely upon a spring to force the plunger and stud to the point where the stud enters the pool of metal, when the circuit of the electromagnet is broken.

The invention relates solely to the means for effecting the desired movement of the stud in respect to the plate, and inasmuch as the other essentials of a commercial apparatus may be of conventional form, constitute no portion of the invention, and are not essential to an understanding of my invention, such conventional parts are not being illustrated or described in detail.

One object of my invention is to provide a simple, inexpensive and efficient means for moving the stud away from the plate, holding it at the desired distance from the plate and releasing it and forcing it into engagement with the plate, and whereby the necessity of cocking the gun and setting the arc gap is eliminated.

A further object of the present invention is to provide connecting means between the plunger and the armature of the magnet, and of such a type and so designed that when the gun is brought into operative position, the stud carrying plunger will automatically assume the desired position with the stud in contact with the plate, and regardless of the length of the stud or the presence or absence of sheathing on the plate, and without change of the normal position of the armature in respect to the electromagnet.

A further object is to substantially relieve the magnet of load during the initial movement of the armature, so that upon closing the circuit, the armature may be set in motion before it takes on the load imposed by the plunger and the resistance of the spring employed to force the stud into engagement with the plate when the magnet circuit is broken.

As an important feature of my invention, a lost motion connection is provided between the plunger and the armature, and the extent of which is unaffected by longitudinal adjustment of the plunger while the magnet is not energized.

As a further important feature, I may employ a gearing between the stud carrier and the actuating mechanism, and of such a form or character that at one point the gearing is out of mesh prior to the energizing of the magnet and comes into mesh only after the magnet is energized. Thus, as the gearing is out of mesh when the magnet is not energized, the plunger may be adjusted to any desired position in respect to the plate and to the armature, and will automatically become connected to the armature only after the magnet is energized and the solenoid armature starts moving, and the armature has a free and unloaded movement while the gearing is being moved into mesh.

In the accompanying drawing:

Fig. 1 shows an apparatus partly in side elevation and partly in section, and embodying one form of my invention.

Fig. 2 is a side view of a part of the tripod.

Fig. 3 is a diagrammatic showing of an alternative form of gearing, and

Fig. 4 is another view of the construction shown in Fig. 3.

In the form illustrated there is employed a plunger 10 having a stud holder 11 for detachably carrying the stud. The plunger is mounted for reciprocation in a sleeve 12 surrounded by an insulating sleeve 16 enclosed by a metallic sleeve 15, and the latter is supported by a tripod 13 which may engage with the plate or with the planking or sheathing disposed thereon. The tripod is shown as provided with a sleeve portion 14 and a clamp which permits the tripod to be adjusted endwise and secured in any desired position. The sleeve 14 is slidable on a sleeve 15 which is preferably spaced from the sleeve 12 by insulation 16.

To effect adjustment of the tripod 13 along the sleeve 15 the latter may be provided with a pin 17 and the sleeve 14 may have a longitudinal slot 18 with notches or recesses 19 along one side thereof. In the slot is mounted a bar 20 which is pressed toward the recesses 19 and against the pin 17 by a spring 21. By partially rotating the sleeve 14, the pin will force the bar back against the spring and leave one recess so that the sleeve may be moved endwise and to the required distance to get the end of the tripod properly positioned in respect to the end of the stud. Upon releasing the sleeve it will partially rotate to move a recess onto the pin and lock the parts together.

The sleeve 12 is rigidly clamped to a handle 23 to which are connected cables 24 and 25 for the electric circuit, and a suitable switch 26 is provided with a button or finger piece 27 permitting the making or breaking of the circuit at the proper time. All of the parts so far referred to may be modified through wide limits without in any way departing from the spirit or scope of my invention.

As an important feature of my invention the handle also carries an electromagnet 30 having an armature 31 which acts to raise the plunger 10 and pull the stud away from the plate, and I provide gearing between the armature 31 and the plunger 10 so that when the magnet is energized, the plunger is pulled up to the required distance and the stud spaced from the plate. In the form illustrated the armature has a rack bar extension 33 and the plunger 10 also has a rack bar extension 34. Between these rack bars there is employed one or more gear wheels which, together with the rack bars, constitute a gearing connection between the armature and the plunger. As an important feature, the parts are so designed and positioned that when the magnet is not energized the gear train is interrupted. As shown, the rack 33 is held out of mesh with the gear 38 by the spring 39. Thus the plunger may be freely raised or lowered and may assume various different positions prior to the energizing of the magnet.

For instance, if the tripod 13 rests upon sheathing on a plate, the plunger will be lowered to such a position that the stud engages the plate and the end of the stud will be substantially below the end of the tripod. Also, the position of the plunger will vary, depending upon the length of the stud which is to be welded in place. Regardless of the position of the plunger, the initial movement of the armature will bring the teeth into mesh, and further movement of the armature will pull up the plunger and space the stud from the plate.

In the form illustrated there are employed a train of three gear wheels 36, 37 and 38; the gear wheel 36 being continuously in mesh with the rack bar 34 and the rack bar 33 being normally out of mesh with the gear wheel 38. The rack bars 33 and 34 are shown substantially parallel, but this is not essential, as the rack bar 33 may be at any desired angle to the rack bar 34. Where spur gears are employed the bars should be in the same plane. If a down movement of the armature causes an up movement of the plunger there should be an odd number of gear wheels. A single gear wheel is the full equivalent for a train of three gear wheels. If the electromagnet be mounted above the gears so that an up movement of the armature causes an up movement of the plunger, then there should be an even number of gears, and one of the three illustrated would be omitted and, if necessary, the diameters of the other two correspondingly changed. The electromagnet may be so positioned as to pull in a horizontal direction rather than vertically, and gears of the bevel rather than spur type may be used.

In order to prevent any possible jamming of the teeth of the rack bar 33 with the gear 38, one or more of the first engaging terminal teeth of said rack bar 33 may be made slightly shorter than the remainder of the teeth. Wheels with friction surfaces rather than toothed surfaces may be employed.

The rack bar 33 is shown in raised position and held up by a coil spring 39 and out of mesh with the gear 38. The plunger is in lowered position and pressed down by a spring 40. When the solenoid is energized, the rack bar 33 descends and almost immediately comes into mesh with the gear wheel 38 and proceeds to raise the plunger and stud to the required distance from the plate to form the arc. The limiting position of the plunger and the stud during the welding period may be controlled by an adjustable stop 42 which is mounted in a disc or bottom wall 43 supporting the coil of the electromagnet. This disc may be threaded into the casing and may be rotated to raise or lower the coil in respect to the armature, and to raise or lower the stop 42. As shown, there is a soft iron ring 44 which with the soft iron armature 31, the soft iron housing 45 and the disc 43, completes the magnetic circuit. The screw 42 may be used for only minor adjustments, while for major adjustments the disc 43 may be rotated to raise or lower the entire coil of the electromagnet 30, including the brass spool 46, and against the action of a coil spring 47.

During the initial movement of the armature it is not subjected to any load other than that of the light spring 39, and therefore acquires some momentum before the rack bar 33 comes into mesh with the gear 38, and this aids in the quick raising of the plunger and stud.

In Figs. 3 and 4 I have illustrated somewhat diagrammatically one of many alternative constructions within the scope of my invention. In this form the rack bar 34a has diagonal teeth meshing with inclined or helical teeth on a gear wheel 36a. The plunger or armature bar 33a of an electromagnet 30a is movable in a direction parallel to the axis of the gear, and has a tooth, pin or projection 50 which is out of engagement with the teeth of the gear when the magnet is not energized, so that the rack bar and gear may be moved freely. Upon energizing the magnet the armature part 33a moves toward the left from the position shown in Fig. 4, and engages between two of the inclined teeth of the gear. Upon further movement it rotates the gear to an extent determined by the helix angle and length of the teeth and the extent of movement of the armature bar. This rotation causes the rack bar 34a to move endwise the same as in the form shown in Fig. 1, and to lift the stud from the plate and form the desired arc.

The ends of the teeth may be pointed or rounded so as to avoid any direct abutting action. The electromagnet 30a may be of the type shown in Fig. 1, and the bar 33a should be provided with a spring, not shown, but acting similarly to the spring 39, to pull the pin or tooth out of mesh with the gear when the circuit is broken.

I have not illustrated the electric circuit, as various different circuits and controls may be employed. It will be understood that upon operating the button or circuit closer 27, the welding circuit is closed to pass current between the stud and plate which are in contact, and thereafter operates to close the circuit of the electromagnet and cause the stud to be pulled to the predetermined distance from the plate. Such circuits usually include a timer which will break the circuit of the electromagnet and let the stud be forced into contact with the plate after a predetermined interval during which the end of the stud is partially melted and the pool of molten metal is formed on the plate. Upon the forcing of the stud into the molten metal, the welding circuit is broken.

Having thus described my invention, what I claim as new and desire to secure by Letters Patent is:

1. A stud welding gun having a plunger adapted to carry a stud, an electromagnet having an armature, and gearing between said armature and said plunger and having a portion thereof out of mesh when said magnet is not energized.

2. A stud welding gun having a plunger adapted to detachably carry a stud and having gear teeth, an electromagnet having an armature provided with gear teeth, and a train of gears for transmitting power from said armature to said plunger, the gear teeth of the armature being out of mesh with said train of gears when said magnet is not energized, and whereby upon energizing said magnet, the armature starts moving to engage the gearing before acting upon said plunger.

3. An apparatus for the arc welding of studs to plates, including a plunger having means for detachably securing a stud thereto, and having rack teeth, a reciprocating actuating member having rack teeth, and gearing for engaging the rack teeth of both said plunger and said member for transmitting motion from one to the other, the rack teeth of said member being out of mesh with said gearing when said stud is in engagement with said plate, and the magnet is not energized.

4. An apparatus for the arc welding of studs to plates, including a plunger having means for detachably securing a stud thereto, and having rack teeth, a reciprocating actuating member having rack teeth, and gearing for engaging the rack teeth of both said plunger and said member for transmitting motion from one to the other, and an electro-magnet for operating said reciprocating member to separate said stud from said plate, the rack teeth of said member being out of mesh with said gearing when said stud is in engagement with said plate and the electromagnet is not energized.

5. An apparatus for the arc welding of studs to plates, including a plunger having means for detachably securing a stud thereto, and having rack teeth, a reciprocating actuating member having rack teeth, and gearing for engaging the rack teeth of both said plunger and said member for transmitting motion from one to the other, and an electro-magnet for operating said reciprocating member to separate said stud from said plate, the rack teeth of said member being out of mesh with said gearing when said stud is in engagement with said plate and said magnet is not energized, said plunger being free to move endwise independently of said actuating member when said magnet is not energized.

6. A stud welding gun having a plunger adapted to carry a stud, an electromagnet having an armature, gearing between said armature and said plunger and having a portion thereof out of mesh when said magnet is not energized, and an adjustable stop for limiting the movement of said armature.

7. A stud welding gun having a plunger adapted to carry a stud, an electromagnet having an armature, gearing between said armature and said plunger and having a portion thereof out of mesh when said magnet is not energized, and means for adjusting said electromagnet endwise in respect to said plunger.

ALBERT M. CANDY.

REFERENCES CITED

The following references are of record in the file of this patent:

UNITED STATES PATENTS

| Number | Name | Date |
| --- | --- | --- |
| 1,410,421 | Steele et al. | Mar. 21, 1922 |
| 2,265,169 | Hughes et al. | Dec. 9, 1941 |